(12) United States Patent
Kikuchi (10) Patent No.: US 11,803,343 B2
(45) Date of Patent: Oct. 31, 2023

(54) JOB PROCESSING APPARATUS, METHOD OF CONTROLLING JOB PROCESSING APPARATUS, AND STORAGE MEDIUM

(71) Applicant: CANON KABUSHIKI KAISHA, Tokyo (JP)

(72) Inventor: Shou Kikuchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/574,421

(22) Filed: Jan. 12, 2022

(65) Prior Publication Data

US 2022/0229617 A1 Jul. 21, 2022

(30) Foreign Application Priority Data

Jan. 19, 2021 (JP) ................................ 2021-006680

(51) Int. Cl.
G06F 3/12 (2006.01)

(52) U.S. Cl.
CPC .......... *G06F 3/1286* (2013.01); *G06F 3/1222* (2013.01); *G06F 3/1242* (2013.01); *G06F 3/1252* (2013.01); *G06F 3/1275* (2013.01)

(58) Field of Classification Search
CPC ...... G06F 3/1226; G06F 3/1207; G06F 3/121; G06F 3/126; G06F 3/1285; G06F 3/1296
See application file for complete search history.

(56) References Cited

U.S. PATENT DOCUMENTS

| | | | |
|---|---|---|---|
| 10,868,708 B2* | 12/2020 | Jayaraman | H04L 41/0668 |
| 2004/0098506 A1* | 5/2004 | Jean | H04L 61/25 709/206 |
| 2015/0002895 A1* | 1/2015 | Nakatsuka | G06F 3/1229 358/1.15 |
| 2018/0101348 A1* | 4/2018 | Ota | H04L 61/2517 |

FOREIGN PATENT DOCUMENTS

JP 2019022038 A 2/2019

* cited by examiner

*Primary Examiner* — John R Wallace
(74) *Attorney, Agent, or Firm* — Canon U.S.A., Inc. IP Division (57) ABSTRACT

A job processing apparatus that communicates with a control apparatus connected to a first network via a second network different from the first network and a first network interface, and communicates with an external apparatus on a third network via a second network interface includes at least one memory that stores a set of instructions, and at least one processor that executes the instructions, the instructions, when executed, causing the job processing apparatus to perform operations including acquiring information regarding the first network from the control apparatus and, based on the acquired information, setting, in a routing table, route information for transmitting data addressed to an external apparatus connected to the first network via the second network and the control apparatus.

13 Claims, 10 Drawing Sheets

| Destination | : Subnet Length | : Gateway Address | : Interface |
|---|---|---|---|
| 0.0.0.0 | : /0 | : 172.33.22.254 | : 172.33.22.11 |
| 127.0.0.0 | : /8 | : On-Link | : 127.0.0.1 |
| 127.0.0.1 | : /32 | : On-Link | : 127.0.0.1 |
| 10.100.1.0 | : /24 | : On-Link | : 10.100.1.2 |
| 172.33.22.0 | : /24 | : On-Link | : 172.33.22.11 |

| Destination | : Subnet Length | : Gateway Address | : Interface |
|---|---|---|---|
| 0.0.0.0 | : /0 | : 172.33.22.254 | : 172.33.22.11 |
| 127.0.0.0 | : /8 | : On-Link | : 127.0.0.1 |
| 127.0.0.1 | : /32 | : On-Link | : 127.0.0.1 |
| 10.100.1.0 | : /24 | : On-Link | : 10.100.1.2 |
| 172.33.22.0 | : /24 | : On-Link | : 172.33.22.11 |
| 192.168.137.0 | : /24 | : 10.100.1.1 | : 10.100.1.2 |

JOB PROCESSING APPARATUS, METHOD OF CONTROLLING JOB PROCESSING APPARATUS, AND STORAGE MEDIUM

BACKGROUND

Field

The present disclosure relates to a job processing apparatus that cooperates with a control apparatus, a method of controlling the job processing apparatus, and a storage medium.

Description of the Related Art

In recent years, job processing apparatuses with multiple functions (such as those of printers and scanners) often include a network interface that allows communication with external apparatuses such as servers and personal computers (PC) on a network.

A known job processing apparatus such as a commercial production printer may perform printing in connection with a control apparatus such as a digital front end (DFE) that controls processing on data to be input to the job processing apparatus. Such a control apparatus may be given a function of receiving print jobs from external apparatuses on a network and temporarily saving print jobs, a function of scheduling jobs to be run by a job processing apparatus, and a function of rendering jobs with high speed.

In order to enhance the quality of security for a network, an office typically uses different networks for different purposes. Japanese Patent Application Laid-Open No. 2019-022038, for example, discusses a job processing apparatus that includes a plurality of network interfaces and is capable of connecting to both a network in a first branch and a network in a second branch different from the first branch via the plurality of network interfaces.

SUMMARY OF THE DISCLOSURE

According to one embodiment of the present disclosure, a job processing apparatus is provided that communicates with a control apparatus connected to a first network via a second network different from the first network and a first network interface, and communicates with an external apparatus on a third network via a second network interface. The job processing apparatus includes at least one memory that stores a set of instructions, and at least one processor that executes the instructions, the instructions, when executed, causing the job processing apparatus to perform operations including acquiring information regarding the first network from the control apparatus and, based on the acquired information, setting, in a routing table, route information for transmitting data addressed to an external apparatus connected to the first network via the second network and the control apparatus.

Further features of the present disclosure will become apparent from the following description of example embodiments with reference to the attached drawings.

DESCRIPTION OF THE EMBODIMENTS

Example embodiments of the present disclosure will be described next with reference to the drawings. The example embodiments described below relate to a job processing apparatus such as a production printer. It is assumed that such a job processing apparatus will also be configured to connect to two different networks in two different respective network branches using two separate network interfaces. For example, the job processing apparatus connects to a network in a first branch for performing ordinary data communication in which management data and scan data are transmitted to external apparatuses or servers via a first network interface, while the job processing apparatus connects to a network in a second branch for communicating with a control apparatus via a second network interface.

The control apparatus such as a digital front end (DFE) with which the job processing apparatus is cooperating also includes two network interfaces—one for receiving jobs from external apparatuses and another for performing communication related to individual jobs with the job processing apparatus. The control apparatus connects to the network in the second branch to communicate with the job processing apparatus via one network interface, while connecting to the network in a third branch to receive jobs from external apparatuses via the other network interface.

It is assumed herein that the job processing apparatus includes a device such as a router on the network in the first branch set as a default gateway to transmit packets in data transmission to the outside not via the control apparatus.

On the other hand, there may be cases where users want to send packet data to an external apparatus on the network in the third branch from the job processing apparatus. However, with a device such as a router on the network in the first branch set as a default gateway, the packets addressed to the external apparatus on the network in the third branch can also be transferred to the network in the first branch as a default gateway. On a network that does not reach the device in the third branch via the first branch network, the job processing apparatus cannot transmit data to the external apparatus on the network in the third branch.

In view of that issue, mechanisms and techniques according to the present example embodiments are provided which enable an easy setting of a route for data transmission to an external apparatus on a network in a different branch where the control apparatus belongs, via a network connecting a job processing apparatus and a control apparatus.

Some example embodiments for carrying out features of the present disclosure for performing the above control will be described below with reference to the drawings. However, the following example embodiments do not limit the scope of the claims, and not all the combinations of the features described as being included in the example embodiments are necessary for a solution of the present invention.

Figure 1:
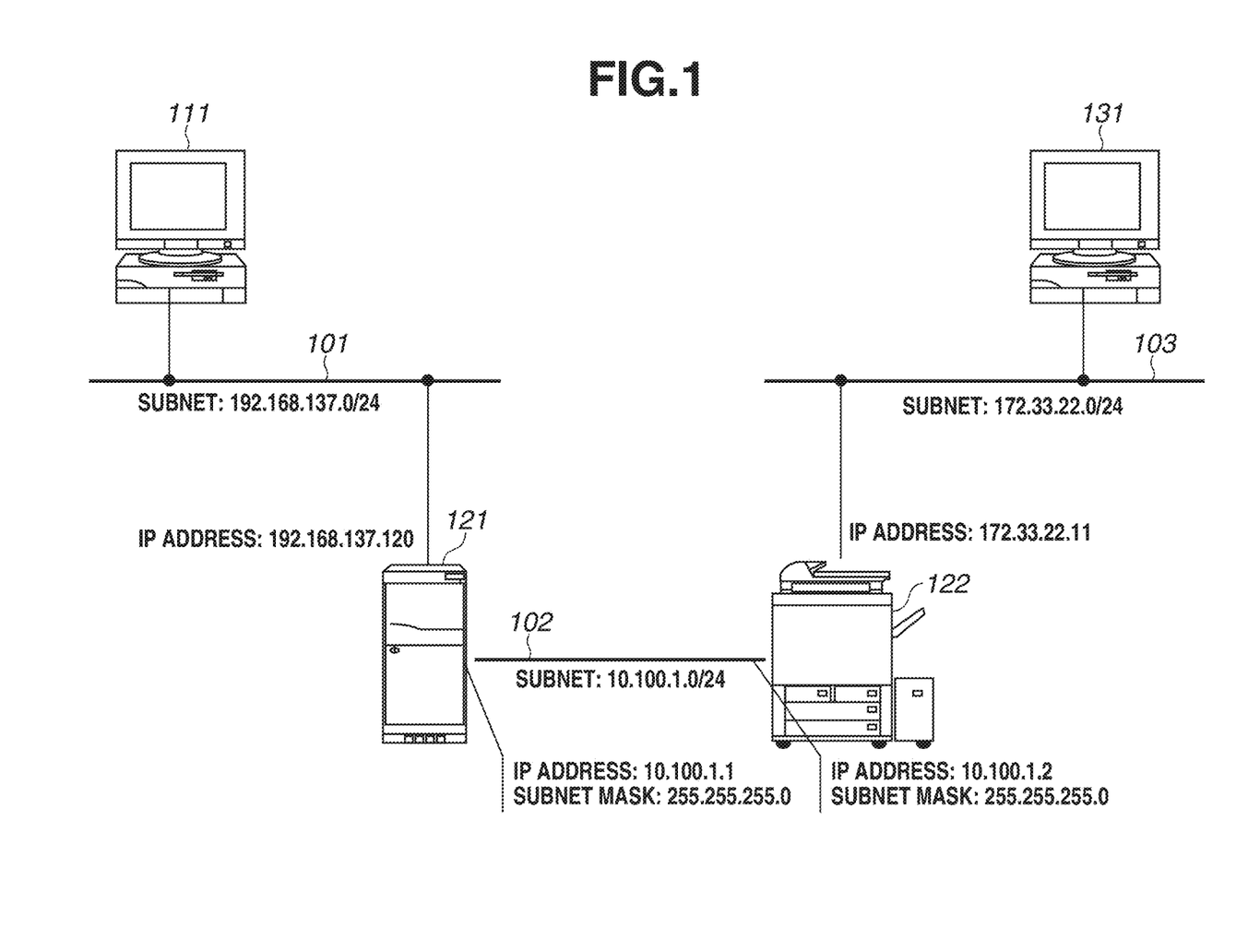
FIG. 1 is a diagram illustrating an example of a job processing system according to one example embodiment.

First, the configuration of a job processing system according to a first example embodiment will be described with reference to FIG. 1. The job processing system according to the present example embodiment includes a multifunction peripheral (MFP) 122, a DFE 121, a client personal computer (PC) 111, and a client PC 131. The MFP 122 is an example of a job processing apparatus and has a print function of printing images on sheets based on print jobs received via a network 103 or print jobs received via the DFE 121.

The MFP 122 also has a scan function of transmitting data based on images obtained by reading documents using a scanner to external apparatuses on the network 103 or external apparatuses on a network 101 via a network 102. In the present example embodiment, the MFP 122, which runs print jobs and scan jobs, will be described as an example of the job processing apparatus, but the present invention is not limited to that. For example, the job processing apparatus may be a 3D (three-dimensional) printer that forms print products having three-dimensional shapes based on 3D print jobs including three-dimensional shape data.

The MFP 122 and the client PC 131 are connected together via the network 103 in a first branch. In the present example embodiment, a "172.33.22.0/24" subnet is assigned to the network 103 in the first branch by way of example. In addition, an Internet Protocol (IP) address "172.33.22.11" is assigned to the network interface to connect to the network 103 in the first branch by way of example.

The DFE 121 and the client PC 111 are connected together via the network 101 in a third branch. In the present example embodiment, a "192.168.137.0/24" subnet is assigned to the network 101 in the third branch by way of example. In addition, an IP address "192.168.137.120" is assigned to the network interface to connect to the network 101 in the third branch by way of example.

The DFE 121 has functions of receiving print jobs from the PC 111 to temporarily save them, of scheduling jobs to be run by the job processing apparatus, and of rendering jobs with high speed. The DFE 121 is an example of a control apparatus to cooperate with the job processing apparatus.

The DFE 121 and the MFP 122 are connected together via the network 102 in a second branch. In the present example embodiment, a "10.100.1.0/24" subnet is assigned to the network 102 in the second branch by way of example. In addition, an IP address "10.100.1.1" is assigned to the network interface of the DFE 121, and an IP address "10.100.1.2" is assigned to the network interface of the MFP 122 by way of example. The network 102 in the second branch is used to communicate control commands and status information to transfer print images, and other information. The network 102 in the second branch is also used as a relay route to transmit data from the MFP 122 to external apparatuses on the network 101 in the third branch.

First, printing via the DFE 121 will be described. The client PC 111 transmits a print job to the DFE 121 via the network 101 in the third branch. After receiving it, the DFE 121 temporarily saves it in a storage in the DFE 121.

If an operator makes setting of job scheduling, the DFE 121 performs a rasterization process of converting page description language (PDL) data included in the print job into bitmap data based on the order of the scheduling. The DFE 121 transmits the print data converted into the bitmap data via cabling (not illustrated) and the print settings via the network 102 in the second branch to the MFP 122. In the present example embodiment, the bitmap data is transmitted via cabling (e.g., a Universal Serial Bus (USB) cable or an image output cable) different from that of the network 102 by way of example. The present invention, however, is not limited to that configuration. For example, a configuration can also be employed in which both the bitmap data and the print settings are transmitted via the network 102.

Next, printing via the network 103 in the first branch will be described. The MFP 122 receives a print job from the client PC 131 via the network 103 in the first branch. Next, based on the print job received from the client PC 131, the MFP 122 performs a rasterization process. Next, based on bitmap data generated by the rasterization process and the print settings of the print job, the MFP 122 prints the image on a sheet.

The network 103 in the first branch also functions as a default gateway in ordinary data communication used in transmission of management data and scan data to external apparatuses or servers. A user such as an administrator assigns IP addresses to the default gateway and the network interface to connect to the network 103 in the first branch. In the present example embodiment, the administrator manually makes operation settings of the network interface to connect to the network 103 in the first branch by way of example, but the present invention is not limited to that example. In some embodiments, the assignment of an IP address and operation settings of a default gateway are made based on setting information received from a router or a Dynamic Host Configuration Protocol (DHCP) server on the network 103.

On the other hand, there are also cases where users want to send data to an external apparatus on the network 101 in the third branch from the MFP 122 via the control apparatus. However, with a device such as a router on the network 103 in the first branch set as the default gateway as described above, packets addressed to an external apparatus on the network 101 in the third branch can also be transferred to the default gateway. For example, if "192.168.137.100" is specified as the transmission destination of an image obtained by reading a document using the scanner, packets will be transferred to the router on the network 103 in the first branch as the default route unless the administrator sets an appropriate static route. On the other hand, if the network configuration illustrated in FIG. 1 is employed, the network 103 will not be connected to the network 101 to allow communicate with the network 101. Thus, the transmission of data to "192.168.137.100", which is the external apparatus on the network 101 in the third branch, can fail.

In view of that issue, the present example embodiment provides an easy setting mechanism to set a route in transmit data from the MFP 122 to an external apparatus on the network 101 in the third branch the DFE 121 cooperating with the MFP 122 belongs to. A detailed description will follow.

<Device Configuration of DFE 121>

A hardware configuration of the DFE 121 according to the present example embodiment will be described with reference to FIG. 2.

Figure 2:
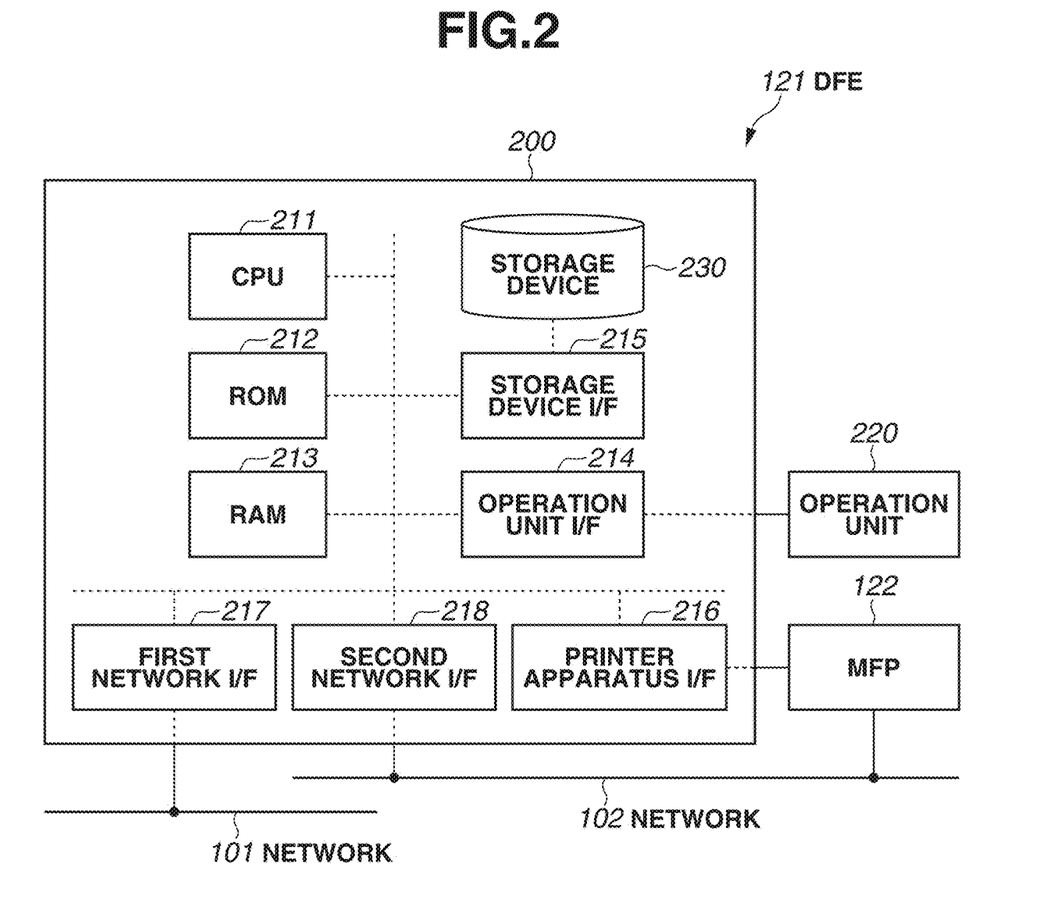
FIG. 2 is a diagram illustrating a hardware configuration example of a control apparatus according to one example embodiment.

FIG. 2 is a block diagram illustrating the hardware configuration of the DFE 121.

A control unit 200 including a central processing unit (CPU) 211 controls the general operation of the DFE 121. Pieces of hardware and interfaces included in the control unit 200 are connected together via system buses indicated by dotted lines to communicate with one another. The CPU 211 reads control programs stored in a read-only memory (ROM) 212 or a storage device 230 and performs the function of scheduling jobs to be run by the job processing apparatus and the function of rendering jobs with high speed for users. The ROM 212 stores control programs that can be run by the CPU 211. A random-access memory (RAM) 213 is a main storage memory to be accessed by the CPU 211, and is used as a work area or a temporary storage area into which various types of control program are loaded. A storage device interface (I/F) 215 is an interface to connect the control unit 200 and the storage device 230. The storage device 230 stores control programs and an operating system (OS).

As the DFE 121 starts, the CPU 211 runs a boot program stored in the ROM 212. That boot program is used to read programs for the OS stored in the storage device 230 and load the programs into the RAM 213. The CPU 211 runs the boot program and then the programs for the OS loaded into the RAM 213 to control the DFE 121. The CPU 211 also loads various types of data and various programs into the RAM 213 and performs control illustrated in flowcharts described below. Pieces of hardware such as the CPU 211, the ROM 212, the RAM 213, and the storage device 230 thus constitute a so-called computer.

In the DFE 121, a single CPU 211 and a single RAM 213 perform the processes illustrated in the flowcharts described below. In some embodiments, another form is employed. For example, pluralities of processors, memories, and storages can also cooperate to perform the processes illustrated in the flowcharts described below. Some of the processes, such as the transmission and reception of data, are performed cooperatively with a hardware circuit included in a communication interface. In addition, the rasterization process may be performed cooperatively with a dedicated hardware circuit (not illustrated), or cooperatively with a graphics processing unit (GPU) (not illustrated).

An operation unit I/F 214 connects an operation unit 220 and the control unit 200. The operation unit 220 includes a display to display various screens, and input devices such as a mouse and a keyboard that receive inputs from users. The operation unit 220 functions as a display unit to display information, and a reception unit to receive instructions from users. The DFE 121 receives through the operation unit 220 an operation of performing job scheduling and an operation of starting to run a job.

Next, network interfaces will be described. The DFE 121 includes a first network OF 217 and a second network I/F 218. The first network I/F 217 is connected to the network 101 in the third branch to receive print jobs from the outside. The second network I/F 218 is connected to the network 102 in the second branch to communicate with the MFP 122.

A cable to communicate bitmap data with the MFP 122 is connected to a printer apparatus I/F 216. The DFE 121 transmits print data in a bitmap format to the MFP 122 via that cable.

<Software Configuration of DFE 121>

Figure 3:
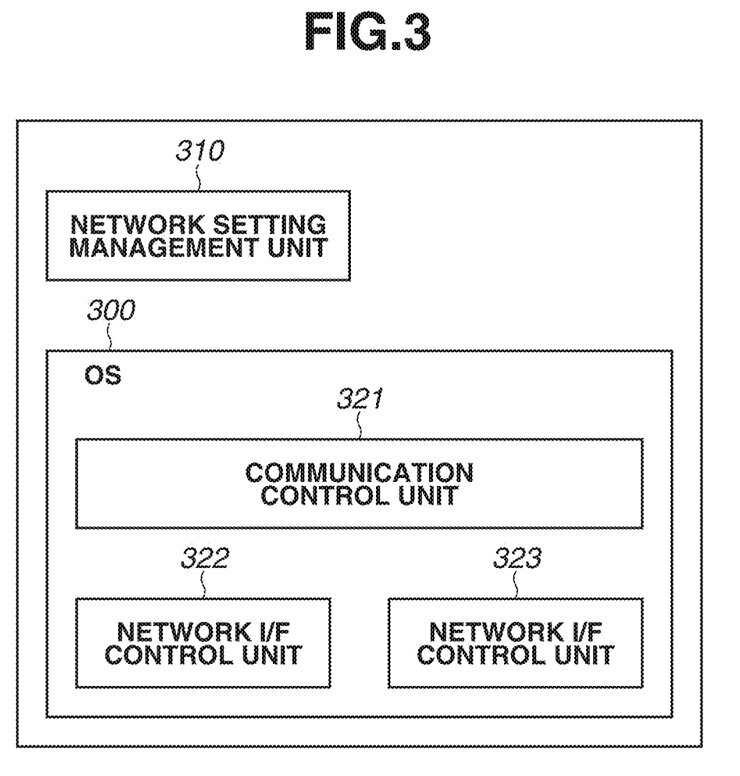
FIG. 3 is a diagram illustrating a software configuration example of the control apparatus according to one example embodiment.

FIG. 3 is a block diagram illustrating a software configuration example of the DFE 121. As space is limited, FIG. 3 illustrates an example of a software configuration for network control as a feature of the present disclosure. That is, FIG. 3 omits a data management module to manage print data, a module to perform job scheduling, and a module to perform the rasterization process.

Software modules are stored as programs in the storage device 230 of the DFE 121, read out to the RAM 213 as appropriate, and controlled and run by the CPU 211. A network setting management unit 310 cooperates with an OS 300 to manage network settings such as IP addresses and subnet masks set to the first network I/F 217 and the second network I/F 218. These network settings are made by the administrator or service engineers. The network setting management unit 310 also has functions of transmitting information based on the managed network settings to the MFP 122 via the second network I/F 218, and of setting a routing function. The network setting management unit 310 cooperates with the OS 300 to make operation settings of a communication control unit 321 and network I/F control units 322 and 323.

The OS 300 includes the communication control unit 321, and the network I/F control units 322 and 323, which control communication interfaces. The communication control unit 321 has a routing function of transferring packets based on a routing table. The management unit 310 cooperates with the OS 300 to make settings, as the settings for the routing function, to transfer packets received from the MFP 122 and addressed to the network 101 in the third branch to the network 101 in the third branch.

<Hardware Configuration of MFP 122>

Figure 4:
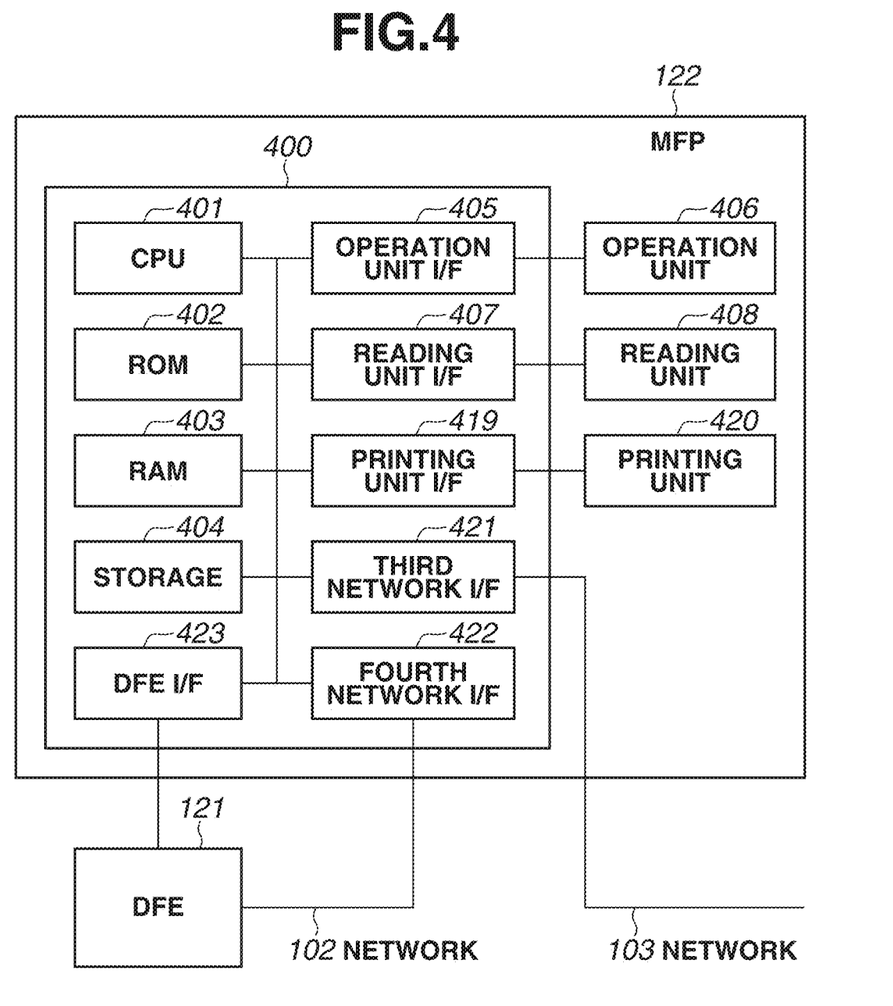
FIG. 4 is a diagram illustrating a hardware configuration example of a job processing apparatus according to one example embodiment.

A hardware configuration of the MFP 122 will be now described with reference to FIG. 4. FIG. 4 is a block diagram illustrating a hardware configuration of the MFP 122. The MFP 122 has a reading function of reading images on sheets, and a file transmission function of transmitting read images to external communication apparatuses. The MFP 122 also has a print function of printing images on sheets.

A control unit 400 including a CPU 401 controls the general operation of the MFP 122. The CPU 401 reads control programs stored in a ROM 402 or storage 404 and performs various types of control such as print control and reading control. The ROM 402 stores boot and control programs that can be run by the CPU 401. The RAM 403 is a main storage memory of the CPU 401 and is used as a work area or a temporary storage area into which various control programs are loaded. The storage 404 stores print data, image data, various programs, various pieces of setting information, and an OS. In the present example embodiment, the storage 404 is an auxiliary storage device such as a hard disk drive (HDD). In some embodiments, a non-volatile memory such as a solid-state drive (SSD) is used instead of the HDD.

As the MFP 122 starts, the CPU 401 runs the boot program stored in the ROM 402. That boot program is used to read programs for the OS stored in the storage 404 and load the programs into the RAM 403. The CPU 401 runs the boot program and then the programs for the OS loaded into the RAM 403 to control the MFP 122. The CPU 401 also loads various types of data and various programs into the RAM 403 to perform the control illustrated in the flowcharts described below. Pieces of hardware such as the CPU 401, the ROM 402, and the RAM 403 thus constitute a so-called computer.

In the MFP 122 according to the present example embodiment, a single CPU 401 performs the processes illustrated in the flowcharts described below, using a single memory (the RAM 403). In some embodiments, another form is employed. For example, a plurality of CPUs, RAMs, ROMs, and storages can also cooperate to perform the processes illustrated in the flowcharts described below. Some of the processes, such as the transmission and reception of data, are performed cooperatively with a hardware circuit included in a communication interface. A configuration can also be employed in which the rasterization process is performed cooperatively with a dedicated hardware circuit (not illustrated). Actual printing and scanning processes are performed cooperatively with a hardware configuration described below.

An operation unit I/F 405 connects an operation unit 406 and the control unit 400. The operation unit 406 includes a liquid crystal display unit with a touch panel function, and various hardware keys to function as a display unit to display information, and a reception unit to receive instructions from users.

A reading unit I/F 407 connects a reading unit 408 and the control unit 400. The reading unit 408 reads a document placed on a document platen or an automatic document feeder (ADF), generating a read image. The generated read image is stored in the storage 404 or the RAM 403. The read image generated by the reading unit 408 is transmitted to an external apparatus such as the PC 111 or 131 via each network interface, or used to print an image on a sheet.

Interfaces to communicate with outside will be now described. The MFP 122 includes a third network I/F 421 and a fourth network I/F 422. The third network I/F 421 is connected to the network 103 in the first branch. The fourth network I/F 422 is connected to the network 102 in the second branch.

A cable to communicate bitmap data with the DFE 121 is connected to a DFE OF unit 423. The MFP 122 receives bitmap data from the DFE 121 via that cable to store it in the storage 404 or the RAM 403. The MFP 122 can also receive print jobs from external apparatuses such as the PC 131 via the third network I/F 421, not via the DFE 121. A print job received not via the DFE 121 is rasterized by the CPU 401 of the MFP 122 or dedicated hardware (not illustrated). The rasterized bitmap data is stored in the storage 404 or the RAM 403.

A printing unit I/F 419 connects a printing unit 420 and the control unit 400. The control unit 400 transfers bitmap data received from the DFE 121 or generated by the MFP 122, and control commands to control the printing unit 420, to the printing unit 420 via the printing unit I/F 419. The printing unit 420 receives the bitmap data and the control commands via the control unit 400 to print a print image on a sheet fed from a sheet holding unit (not illustrated). The printing unit 420 may print in an electrophotographic method, or in an inkjet method.

The printing unit 420 completes the printing operation on the sheet as a print product (the sheet), which subsequently undergoes post-processing, such as a binding process of binding a bundle of documents with metal staples on a copy-by-copy basis or a punching process of punching holes, by a sheet processing unit (not illustrated) as appropriate. The finished print product that has undergone post-processing is discharged to a sheet discharge tray (not illustrated).

In the present example embodiment, the MFP 122 includes the third network I/F 421 and the fourth network I/F 422 by way of example, but, the present invention is not limited to that configuration. For example, a configuration may be employed in which the MFP 122 includes one of the network I/Fs, and the other network I/F is added via a USB interface. In some embodiments that use a USB interface, a USB port is provided outside the housing of the MFP 122 for external connection to a USB peripheral device and/or a USB cable, which are detachable. Peripheral devices compliant with the USB standards can connect to the USB port.

A user such as the administrator can connect a USB-compatible network card (also referred to as a "USB-LAN adapter") to the USB port for external connection to add a network in a branch corresponding to the other network I/F.

In the present example embodiment, the third network I/F 421 and the fourth network I/F 422 are communication interfaces to perform wired communication compliant with Ethernet®, but the present invention is not limited to that configuration. In some embodiments, for example, the third network I/F 421 or the fourth network I/F 422 is a wireless communication interface compliant with the Institute of Electrical and Electronics Engineers (IEEE) 802.11 series. In other embodiments, both the third network I/F 421 and the fourth network I/F 422 are wireless communication interfaces.

In some embodiments, the MFP 122 include three or more network interfaces, one of which is connected to the network 102 in the second branch to communicate with the DFE 121. Another network interface different from the network interface connected to the DFE 121 functions as a network interface to transmit packets to the default gateway.

<Software Configuration of MFP 122>

Figure 5:
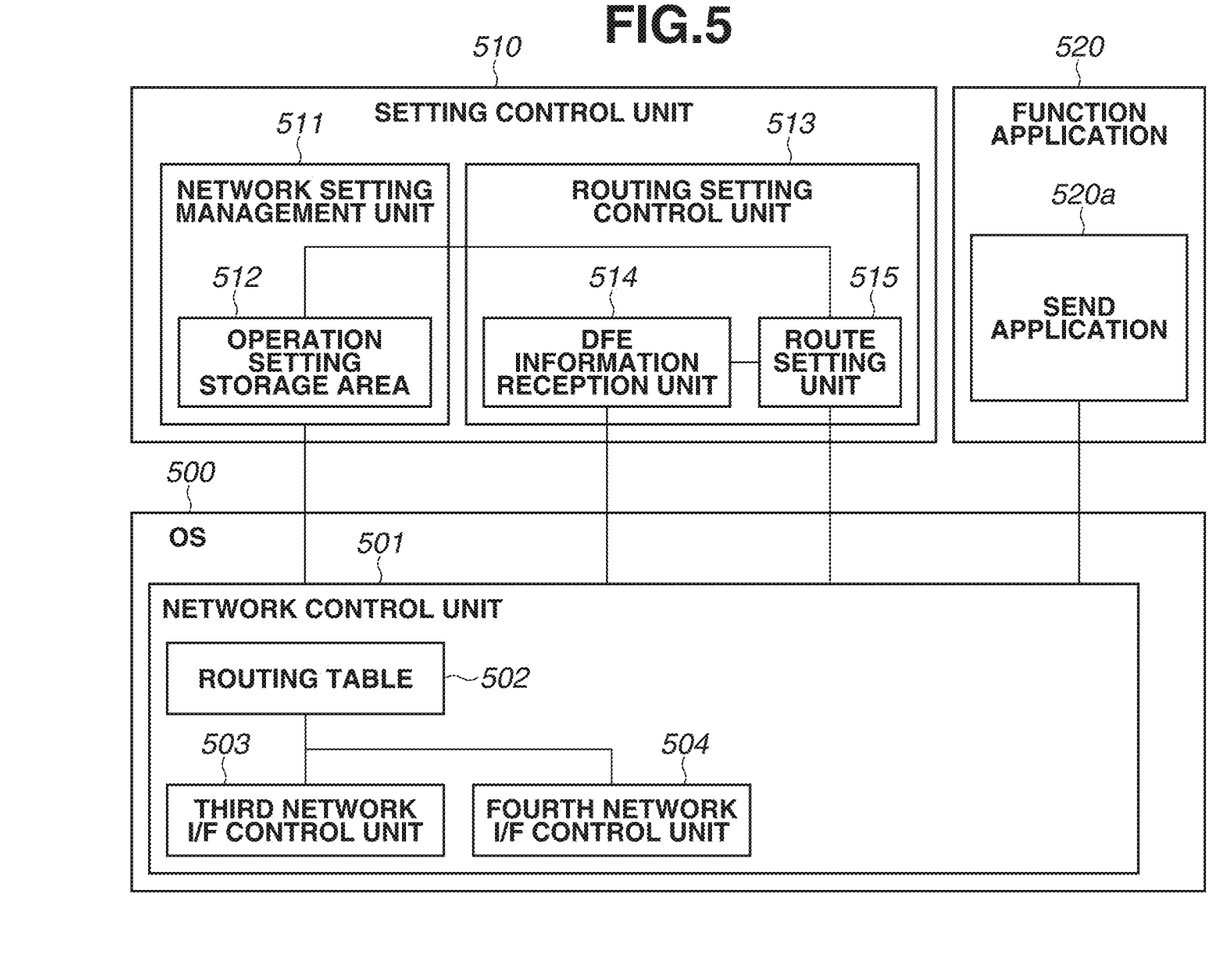
FIG. 5 is a diagram illustrating a software configuration example of the job processing apparatus according to one example embodiment.

FIG. 5 is a block diagram illustrating an example of a software configuration of the MFP 122. Software modules are stored as programs in the storage 404 of the MFP 122, read to the RAM 403 as appropriate, and run by the CPU 401. As space is limited, FIG. 5 illustrates an example of a software configuration for network control alone as a feature of the present disclosure. FIG. 5 omits modules related to the printing process as appropriate.

A setting control unit 510 includes a network setting management unit 511 to provide operation settings of the network I/Fs. The setting control unit 510 also includes a routing setting control unit 513 to function to set a route to transmit packets addressed to external apparatuses on the network 101 in the third branch via the network 102 in the second branch and the DFE 121.

The management unit 511 manages operation setting values regarding the network interfaces. An operation setting storage area 512 is an area where the operation setting values of IP addresses and subnet masks assigned to the network interfaces, and of a default gateway are stored. The operation setting values are set by a user such as the administrator via a setting screen (not illustrated). The default gateway is to be set as the transfer destination of packets when no appropriate route is found in a routing table. The MFP 122 according to the present example embodiment is configured to make operation settings of the default gateway as operation settings for the third network I/F 421 to perform ordinary data communication. On the other hand, the MFP 122 is configured not to make operation settings of the default gateway as operation settings for the fourth network I/F 422 to connect to the DFE 121.

Based on operation setting values stored in the operation setting storage area 512, the management unit 511 sets a default route in a routing table 502 managed by a network control unit 501 of an OS 500. Packets of which the transmission destination cannot be determined by this process are set to be transferred to a device such as the router on the network 103 in the first branch as an operation setting. The management unit 511 cooperates with the OS 500 to assign IP addresses to I/F control units 503 and 504 and configure operation modes of the interfaces.

The routing setting control unit 513 will be now described. A DFE information reception unit 514 receives the network configuration of the DFE 121 from the DFE 121. The network configuration received by the reception unit 514 includes network information regarding the network 101 in the third branch to which the DFE 121 is connected, and an IP address used by the DFE 121 to connect to the network 102 in the second branch. The reception unit 514 transmits the received network information to a route setting unit 515. After receiving the network information, the route setting unit 515 determines whether a route setting is to be made. If the route setting unit 515 determines that a route setting is to be made, the route setting unit 515 sets a static route to communicate with an external apparatus on the network 101 in the third branch via the DFE 121 and the network 102 in the second branch. With the network configuration illustrated in FIG. 1, a route is set to transfer data addressed to the transmission destination that belongs to the "192.168.137.0/24" network segment to the DFE 121 (10.100.1.1).

If the network control unit 501 of the OS 500 receives from an application 520 a request to transmit data to the outside, the network control unit 501 determines via which of the network interfaces the packet data is to be transferred, based on route information registered in the routing table 502.

Next, the network control unit 501 requests a network interface control unit to transfer packets, to transmit the data from the determined network interface. If the control unit 501 determines that the packet data is to be transmitted via the third network I/F 421, the control unit 501 requests the third network I/F control unit 503 to transmit the packet data. If, on the other hand, the control unit 501 determines that the packet data is to be transmitted via the fourth network I/F 422, the control unit 501 requests the fourth network I/F control unit 504 to transmit the packet data.

An example of the application 520 will be now described. The MFP 122 includes a SEND application 520a to transmit data based on the image obtained by reading a document using the reading unit 408 to the destination specified by the user. In response to a receipt of a user operation to start transmission with a destination specified by the user, the reading unit 408 starts reading a document. Based on data obtained by reading the document, the application 520a generates a transmission file such as a Portable Document Format (PDF) file. Next, the application 520a cooperates with the network control unit 501 of the OS 500 to transmit the generated file data to the specified destination.

The transmission route of the file data will be described. In the routing table 502, a static route to transfer data addressed to the transmission destination that belongs to the "192.168.137.0/24" network segment to the DFE 121 (10.100.1.1) is set based on the above route setting. Thus, the control unit 501 transfers packets with the destinations specified as "192.168.137.2" to "192.168.137.254" to the DFE 121. Thus, packet data with the destination specified as the PC 111 is transferred to the DFE 121. After receiving the packets, the DFE 121 transmits the packets to the network 101 in the third branch via the network interface connected to the network 101 in the third branch as the destination of the packets indicates an external terminal on the network 101 in the third branch.

Figure 6:
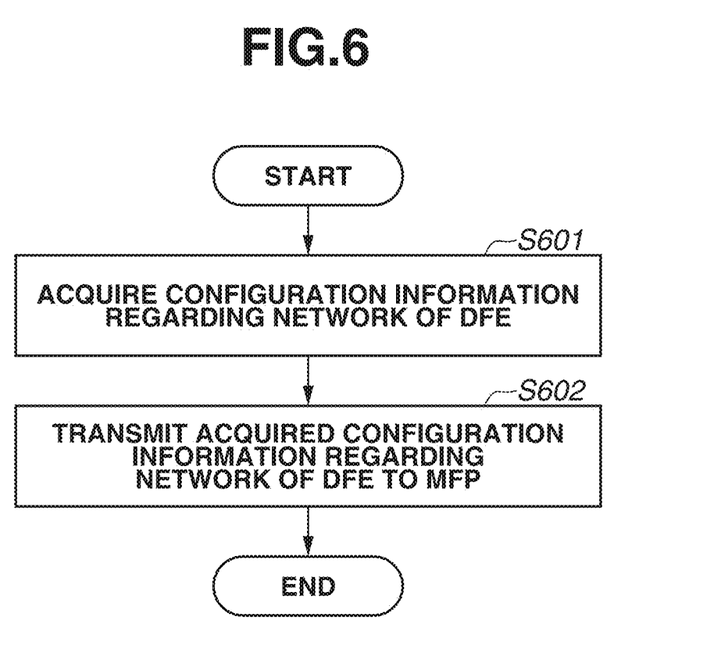
FIG. 6 is a flowchart illustrating an example of control performed by the control apparatus according to one example embodiment.
Figure 7:
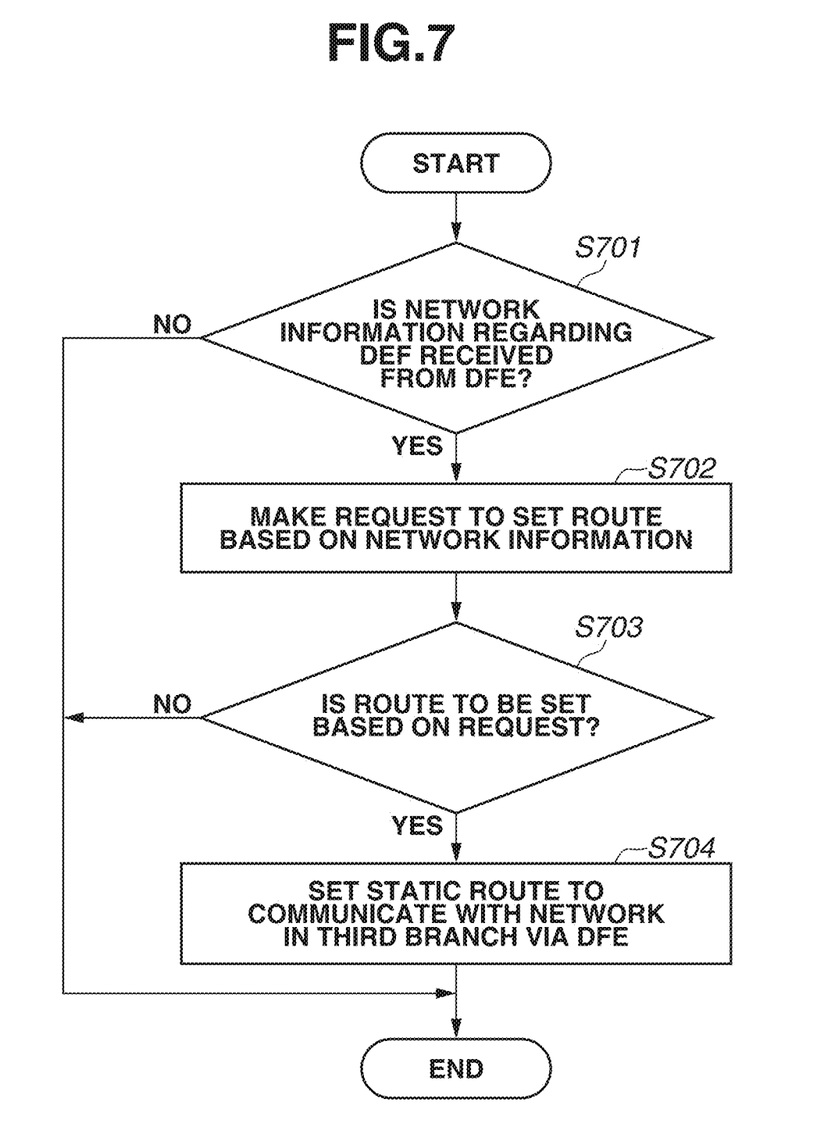
FIG. 7 is a flowchart illustrating an example of control performed by the job processing apparatus according to one example embodiment.

Specific processing will be now described with reference to flowcharts illustrated in FIGS. 6 and 7 and a schematic diagram of a routing table illustrated in FIG. 8. FIG. 6 is an example of a flowchart of which the processing is performed by the CPU 211 of the DFE 121. FIG. 7 is an example of a flowchart of which the processing is performed by the CPU 401 of the MFP 122.

First, the control of the DFE 121 will be described. Operations (steps) illustrated in the flowchart in FIG. 6 are performed by the CPU 211 loading programs for implementing control modules stored in the ROM 212 or the storage device 230 into the RAM 213 and running them. The processes of transmitting and receiving data are performed cooperatively with network I/Fs. When it should be clarified what performs the processing, the description will be given with the subject that is a software module implemented by the CPU 211. Processes in FIG. 6 are performed in response to a start of the DFE 121 in a power-off state, or to a change made in the configuration of the network 101 in the third branch.

In step S601, the management unit 310 acquires configuration information regarding the network 101 in the third branch and information indicating IP addresses assigned to the network interfaces (the second network I/F 218 and the first network I/F 217). The configuration information regarding the network 101 in the third branch includes information for identifying the network address of the network 101 in the third branch. For example, the configuration information includes the network address and the prefix length. In some embodiments, the configuration information includes IP addresses and subnet masks assigned to network interfaces to connect to the network 101 in the third branch. If the configuration of the network 101 in the third branch changes, the management unit 310 acquires information for identifying the network address of the network 101 in the third branch after the change.

Next, the management unit 310 cooperates with the network I/F control unit 323 and the second network I/F 218 to transmit the network information acquired in step S601 to the MFP 122.

If the transmission process is completed, the overall processes ends. That transmission process transmits information to set a static route to the MFP 122.

The control of the MFP 122, which receives the information, will be now described. Operations (steps) illustrated in the flowchart in FIG. 7 are performed by the CPU 401 loading programs for implementing control modules stored in the ROM 402 or the storage 404 into the RAM 403 and running them. The processes of transmitting and receiving data are performed cooperatively with network I/Fs. When it should be clarified what performs the processing, the description will be given with the subject that is a software module implemented by the CPU 401. The processes in FIG. 7 illustrate a static route setting process performed in response to a transmission of network information by the DFE 121.

In step S701, the DFE information reception unit 514 cooperates with the network control unit 501 of the OS 500 to determine whether the network information regarding the DFE 121 is received from the DFE 121. If the network information regarding the DFE 121 is received (Yes in step S701), the processing proceeds to step S702. Otherwise (No in step S701), the overall processes ends. In step S702, the reception unit 514 transmits a setting request to set a route, including the received network information, to the route setting unit 515. In step S703, after receiving the setting request, the setting unit 515 determines whether a route setting is to be made. Specifically, the setting unit 515 determines whether the network 101 in the third branch identified based on the network information included in the setting request can be reached via the network 103 in the first branch. The setting unit 515 transmits to the network 103 the packets received from the DFE 121 and addressed to the IP address (192.168.137.120 in FIG. 1) assigned to the network interface used by the DFE 121 to connect to the network 101 in the third branch. In the present example embodiment, the setting unit 515 attempts to acquire the model name and the device name of the DFE 121 using a Get Request operation specifying a predetermined object identification (OID), which requests the model name and the device name of a partner device. That is, the setting unit 515 transmits a Simple Network Management Protocol (SNMP) packet for acquiring information regarding a management information base (MIB) managed by the DFE 121. The present invention, however, is not limited to this. In some embodiments, for example, the setting unit 515 transmits a Ping request specifying "192.168.137.120" in FIG. 1 as a destination IP address to the network 103 and determine whether that destination can be reached.

If the setting unit 515 receives an appropriate response to the packet (Yes in step S703), the setting unit 515 determines that the network 101 in the third branch can be reached via the network 103 in the first branch. Then, the overall processes ends. Otherwise (No in step S703), the setting unit 515 determines that the network 101 in the third branch cannot be reached via the network 103 in the first branch. Then, the processing proceeds to step S704.

In step S704, the setting unit 515 sets a static route to communicate with an external apparatus on the network 101 in the third branch via the DFE 121 and the network 102 in the second branch. With the network configuration in FIG. 1, a route is set to transfer data addressed to the transmission destination that belongs to the "192.168.137.0/24" network segment to the IP address (10.100.1.1) of the DFE 121.

The setting unit 515 requests the OS 500 to set a route, using a network setting command provided by the OS 500. For example, with the network configuration in FIG. 1, the setting unit 515 transmits a command specifying an argument "route add 192.168.137.0/24 via 10.100.1.1" to the OS 500. That is, the network address of the network 101 in the third branch is specified as a destination network, and the DFE 121 is specified as a gateway (an output destination). In some embodiments, the setting unit 515 is configured to open a setting file managed by the network control unit 501 of the OS 500 and update the setting file. In other embodiments, the setting unit 515 is configured to further explicitly specify an interface used in output using a "dev" argument when route information is added. An explicit specification of an interface used in output using a "dev" argument allows the interface used in output to be fixed, making it easy to track a packet in case of trouble with a network.

A description will be given of route information registered based on the request to set a route with reference to FIGS. 8A and 8B. FIGS. 8A and 8B are schematic diagrams illustrating examples of route information registered in the routing table 502. FIG. 8A illustrates an example of a routing table before the static route is registered. FIG. 8B illustrates an example of the routing table after the static route is registered.

Figure 8A:
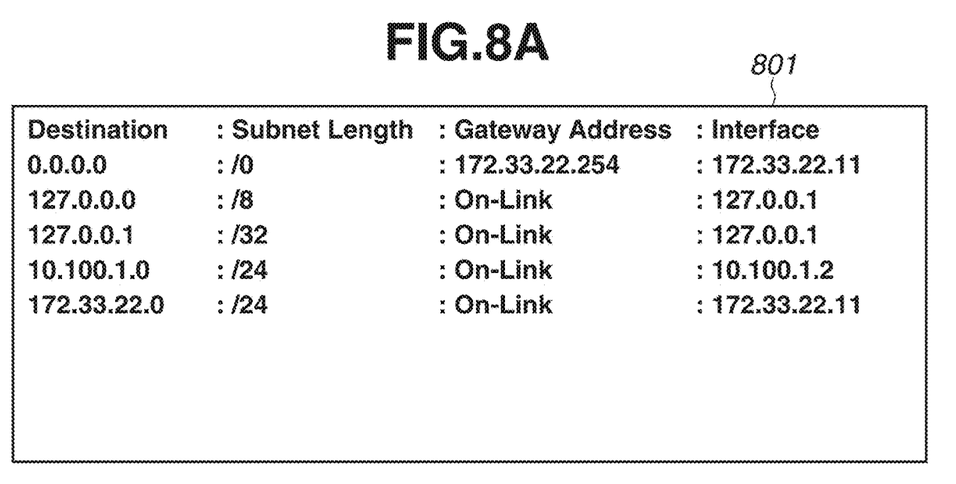
FIGS. 8A and 8B are schematic diagrams illustrating examples of a routing table managed by the job processing apparatus according to one example embodiment.

For the MFP 122 to transmit packet data to the PC 111 with route information 801 illustrated in FIG. 8A registered, the control unit 501 transmits packets to a default route (172.33.22.254) illustrated in the route information 801. This is because a route that matches the IP address (192.168.137.50) of the PC 111 is the default route alone. Thus, if the network 103 in the first branch and the network 101 in the third branch are not connected together, the PC 111 as the destination cannot be reached.

Figure 8B:
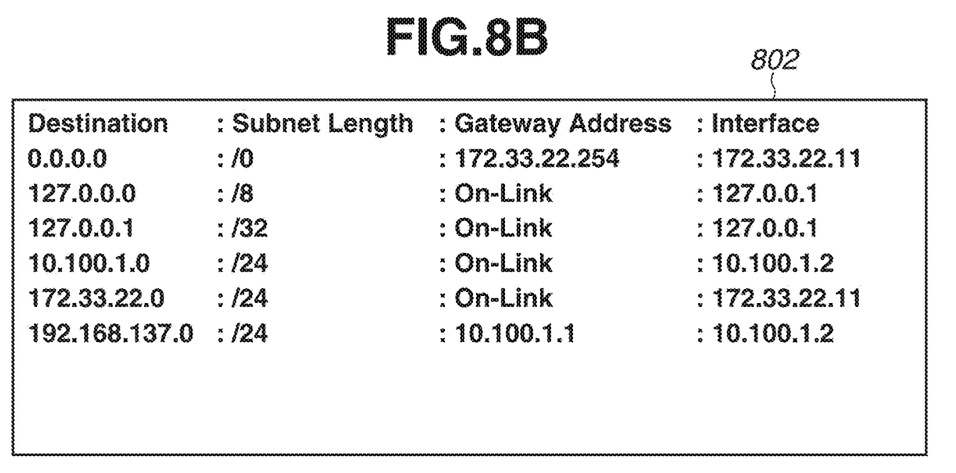

If, on the other hand, as illustrated in FIG. 8B, route information 802 is newly registered in the routing table, the PC 111 can be reached via the network 102 in the second branch. The route information 802 indicates that a packet addressed to the destination apparatus that belongs to the "192.168.137.0/24" network should be transmitted to "10.100.1.1".

Based on the routing table illustrated in FIG. 8B, the network control unit 501 transfers a packet addressed to the IP address (192.168.137.50) of the PC 111 to the DFE 121. In this case, two routes, namely the route described in the route information 801 and the route described in the route information 802, are candidates for a communication route. Next, according to the longest match principle, the network control unit 501 selects the route of which the subnet mask length is longer. Then, the network control unit 501 transmits the packet to the outside. In this case, the route described in the route information 802, of which the subnet mask length is longer, is selected as the route to transmit the packet data addressed to 192.168.137.50, the route described in the route information 802. Thus, the packet data is transmitted to the gateway apparatus of the IP address "10.100.1.1" (i.e., the DFE 121 in FIG. 1). After receiving the packet, the DFE 121 transfers the packet to the PC 111 on the network 101 in the third branch (192.168.137.0/24). Thus, communication can be appropriately performed.

In the present example embodiment, whether a route setting is to be made is determined based on the result of the transmission and reception of a packet. The present invention, however, is not limited to that. In some embodiments, for example, a configuration is employed in which a user such as an administrator or a service engineer is allowed to make operation settings regarding a connection form, and whether to register route information is switched based on these operation settings.

Figure 9:
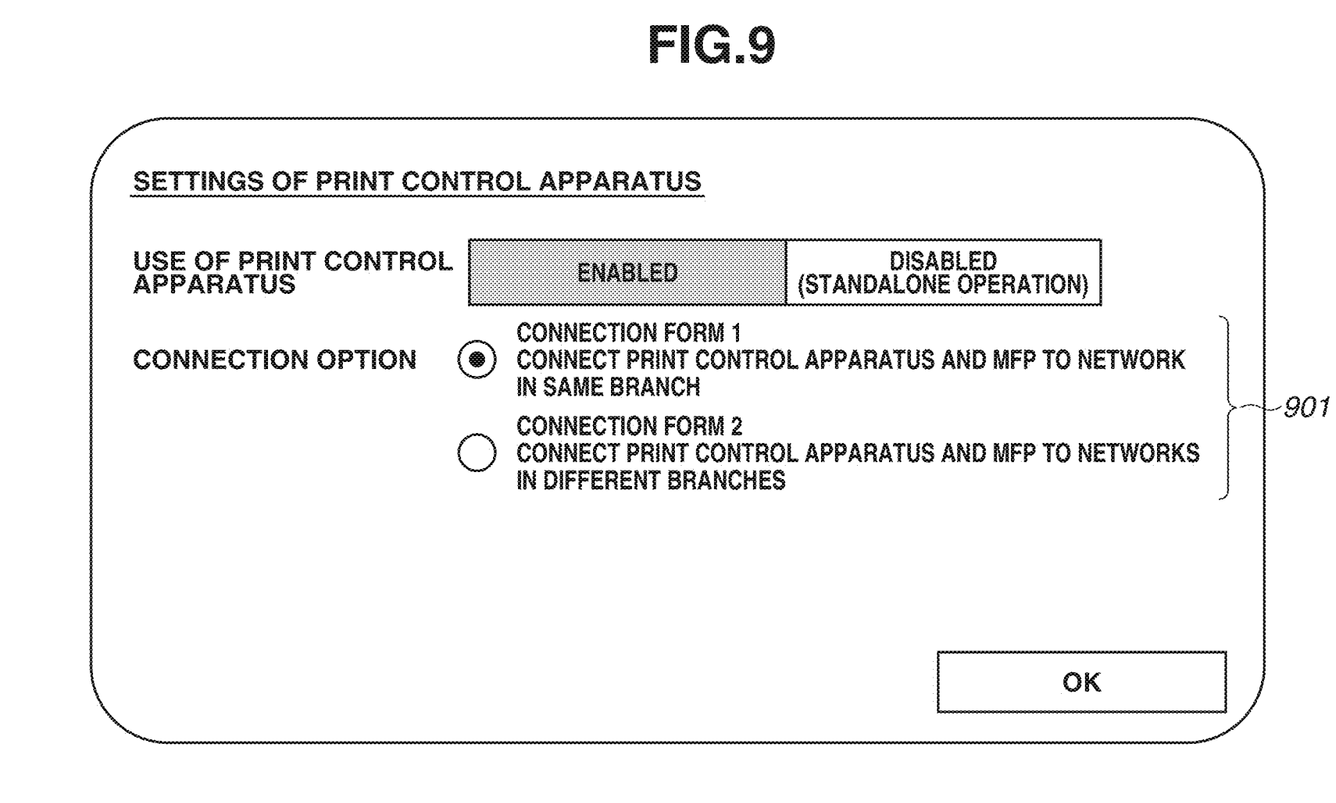
FIG. 9 is a diagram illustrating an example of a setting screen displayed by the job processing apparatus according to one example embodiment.

A specific example of that configuration will be described with reference to FIG. 9. FIG. 9 is an example of a screen displayed on the operation unit 406 of the MFP 122 and for making operation settings regarding a connection form. A user such as the administrator or a service engineer can set whether to use the DFE 121 on the screen illustrated in FIG. 9. The user can also set a connection option to use the DFE 121.

First, connection options will be described. A connection form 1 is a connection option used when a network branch for receiving jobs via the DFE 121 and a network branch for directly receiving jobs not via the DFE 121 are made common. In this connection form, the administrator or the service engineer constructs a network environment that allows the MFP 122 to communicate with the network 101 in the third branch not via the DFE 121. Thus, route information is not registered.

On the other hand, a connection form 2 is a connection option for separating networks used when a network branch for receiving jobs via the DFE 121 and a network branch for directly receiving jobs not via the DFE 121 are made different. If a network including the networks 103 and 102 and a network including the network 101 is separated from the viewpoint of security and printing is performed using a single MFP 122, the connection option will be used. In terms of security, it is avoided that data that an end user wants to send to an external apparatus on the network 101 in the third branch is transmitted to the network 103 in the first branch.

Thus, with the connection form 2 set as an operation setting, a static route to transfer packets to the network 101 in the third branch via the DFE 121 is set even if packets can reach the DFE 121 via the network 103 in the first branch.

Referring back to FIG. 9, radio buttons 901 are display items used to exclusively select a connection option. The user uses the radio buttons 901 to select either of the connection forms 1 and 2. If the CPU 401 detects an operation on the radio buttons 901, the CPU 401 updates the display based on the detected operation. Based on the detected operation, the CPU 401 also changes operation settings regarding the connection form.

The operation settings after the change are stored in the storage 404 of the MFP 122.

If operation settings regarding the connection form are made on the MFP 122, the CPU 401 performs a determination process based on the operation settings regarding the connection form, instead of the determination process described in step S703. If the connection form 1 is set as an operation setting, the CPU 401 determines that a route setting is not to be made. Then, the overall processes ends. If, on the other hand, the connection form 2 is set as an operation setting, the CPU 401 determines that a route setting is to be made. Then, the processing proceeds to step S704.

The above mentioned processing allows the application 520 such as a SEND application to transmit images obtained by scanning documents to external destinations to transmit data via an appropriate route.

A second example embodiment will be described. In the second example embodiment, a description will be given of a mechanism of appropriately managing route information even if the configuration of the network 101 in the third branch is changed, in addition to the processing according to the first example embodiment. The hardware configurations of apparatuses as the premise in the second example embodiment are similar to those in the first example embodiment. Detailed descriptions of the components similar to those in the first example embodiment will be omitted.

Figure 10:
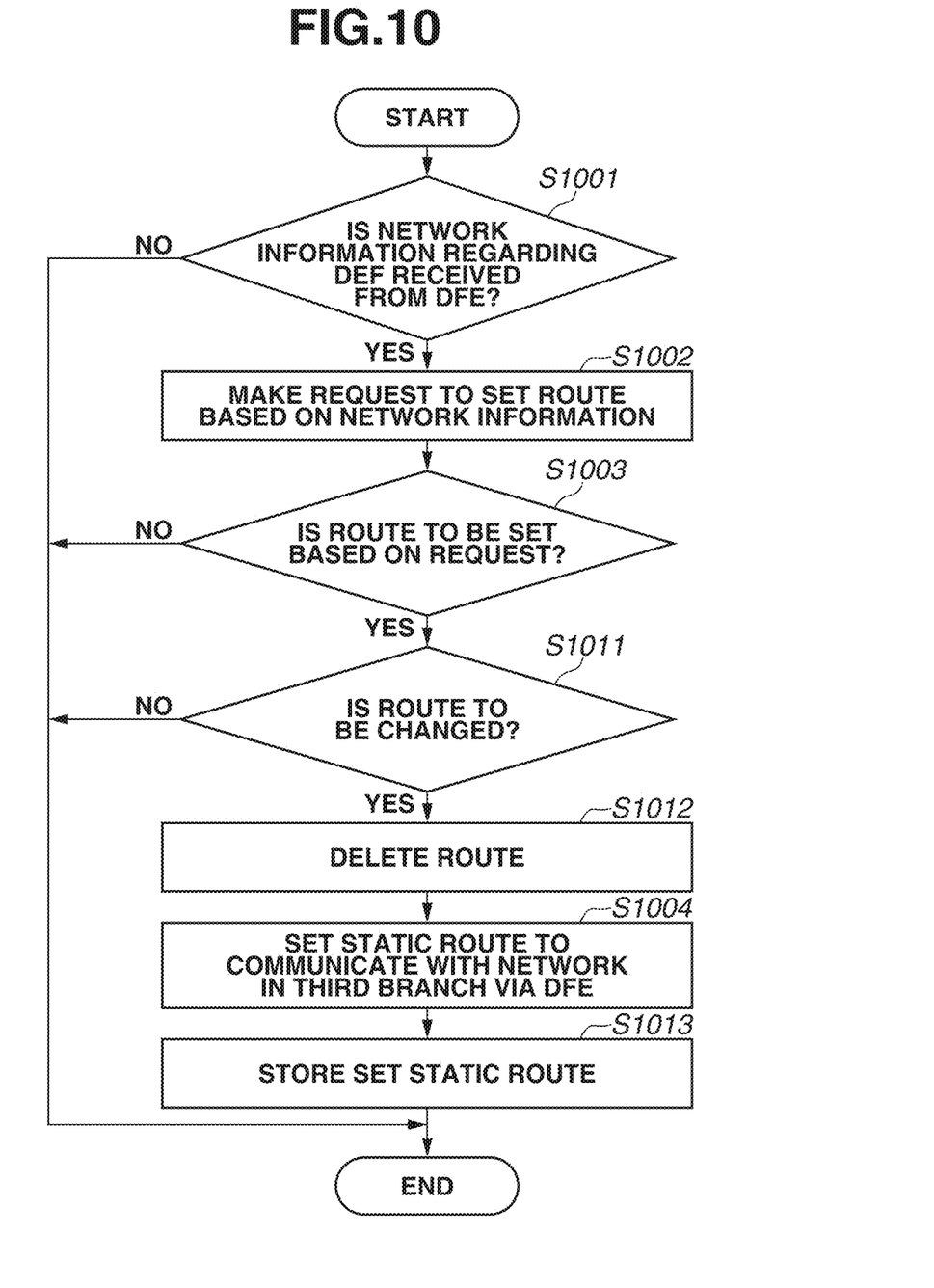
FIG. 10 is a flowchart illustrating an example of control performed by a job processing apparatus according to one example embodiment.

FIG. 10 is a flowchart illustrating an example of processing performed instead of the processes illustrated in the flowchart in FIG. 7 according to the first example embodiment. FIG. 10 is different from FIG. 7 in that the processes of steps S1011, S1012, and S1013 are further carried out.

The processes of steps S1001 to S1003 are similar to those of steps S701 to S703, which will not be described.

In step S1011, the route setting unit 515 of the MFP 122 determines whether the route needs to be changed. If it is determined that the route is to be changed (Yes in step S1011), the processing proceeds to step S1012. Otherwise (No in step S1011), the overall processes ends. Specific description will follow. The route setting unit 515 determines whether route information stored when the route has previously been set and route information identified based on the current request to set a route match each other. If it is determined that the pieces of route information do not match each other, the processing proceeds to step S1012. If it is determined that the pieces of route information match each other, the overall processes ends. In some embodiments, a configuration is employed in which if it is determined that the pieces of route information match each other, a message indicating a network error is displayed on the operation unit 406.

In step S1012, the setting unit 515 performs a deletion process of deleting the set static route information. Using a network setting command provided by the OS 500, the setting unit 515 requests the OS 500 to delete the route. If the route has been set by rewriting a setting file in the route setting described with reference to FIG. 7, the setting unit 515 performs the process of deleting the corresponding character string in the setting file. If it is determined in step S1011 that the pieces of route information do not match each other due to the fact that route information has not previously been stored, the setting unit 515 skips the deletion process.

In step S1004, the setting unit 515 sets a static route similarly to the process described in step S704. If the setting is completed, the processing proceeds to step S1013.

In step S1013, the setting unit 515 stores the route information set in step S1004 in a predetermined storage area. The route information stored in step S1013 is used in the determination in step S1011.

The above mentioned processing enables an appropriate detection of a change in the network configuration of a DFE and an update of static route information in conjunction with the change.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While example embodiments have been described in the present disclosure, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-006680, filed Jan. 19, 2021, which is hereby incorporated by reference herein in its entirety.

What is claimed is:

1. A job processing apparatus comprising:
a first network interface wherein the job apparatus is able to communicate, via the first network interface, with an external apparatus connected to a first network;
a second network interface which is different from the first network interface, wherein the job apparatus is able to communicate, via the second network interface, with a control apparatus connected to a third network which is different from the first network and wherein the control apparatus is able to communicate via a network interface with the external apparatus connected to the first network via a second network which is different from the first network and the third network;
at least one memory that stores a set of instructions; and
at least one processor that executes the instructions, the instructions, when executed, causing the job processing apparatus to perform operations comprising:
acquiring, via the second network interface, information regarding the third network from the control apparatus;
performing determination based on the acquired information regarding the third network whether the third network cannot be reached via the first network using the first network interface; and
in a case where the determination based on the acquired information regarding the third network is that the third network cannot be reached via the first network using the first network interface, based on the acquired information regarding the third network, setting, in a routing table, route information for transmitting data addressed to the external apparatus connected to the first network via the second network and the control apparatus,
wherein in a case where the determination based on the information regarding the third network is that the third network can be reached via the first network using the first network interface, based on the acquired information regarding the third network, the route information for transmitting data addressed to the external apparatus connected to the first network via the second network and the control apparatus, is not set in the routing table.

2. The job processing apparatus according to claim 1, wherein based on the routing table managed by the job processing apparatus, data that is addressed to an external apparatus and of which a route to output cannot be identified is transmitted to the first network via the first network interface.

3. The job processing apparatus according to claim 1, wherein in a case where the third network cannot be reached via the first network interface, the route information is set in the routing table, and
wherein in a case where the third network can be reached via the first network interface, the route information is not set in the routing table.

4. The job processing apparatus according to claim 3, wherein the operations further comprise determining whether the third network can be reached via the first network interface.

5. The job processing apparatus according to claim 1, wherein the operations further comprise setting whether to separately use a network branch for receiving a job via the control apparatus and a network branch for receiving a job not via the control apparatus,
wherein in a case where the setting to separately use the network branches is made, the route information is set in the routing table, and
wherein in a case where the setting to separately use the network branches is not made, the route information is not set in the routing table.

6. The job processing apparatus according to claim 1, wherein the job processing apparatus is a printing apparatus that receives a print job via the control apparatus or the first network interface and prints an image on a sheet based on the print job.

7. The job processing apparatus according to claim 1, wherein in the setting of the route information, a network address of the third network identified based on the acquired information is specified as a destination network, and the route information specifying the control apparatus as a gateway device indicating a transmission destination of a packet addressed to an external apparatus on the destination network is set in the routing table, and
wherein in a case where data is to be transmitted to the external apparatus, the job processing apparatus determines the transmission destination of the data based on the routing table.

8. The job processing apparatus according to claim 7, wherein the acquired information includes at least the network address of the third network to which the control apparatus is connected.

9. The job processing apparatus according to claim 7, wherein in the setting, the route information further specifying the second network interface as a network interface used to transmit the packet is set in the routing table.

10. The job processing apparatus according to claim 7, wherein the operations further comprise setting a default gateway as a setting regarding the first network interface, and setting route information indicating a default route in the routing table based on the setting of the set default gateway.

11. The job processing apparatus according to claim 7, wherein the operations further comprise, in a case where a network to which the control apparatus is connected changes from the third network to a fourth network, deleting the route information from the routing table and registering route information for transmitting data via the second network and the control apparatus to an external apparatus on the fourth network to which the control apparatus is connected, thereby updating the routing table.

12. A method of controlling a job processing apparatus, the job processing apparatus having a first network interface wherein the job apparatus is able to communicate, via the first network interface, with an external apparatus connected to a first network, and a second network interface which is different from the first network interface, wherein the job apparatus is able to communicate, via the second network interface, with a control apparatus connected to a third network which is different from the first network and wherein the control apparatus is able to communicate via a network interface with the external apparatus connected to the first network via a second network which is different from the first network and the third network, and the method comprising:
acquiring, via the second network interface, information regarding the third network from the control apparatus;
performing determination based on the acquired information regarding the third network whether the third network cannot be reached via the first network using the first network interface; and
in a case where the determination based on the acquired information regarding the third network is that the third network cannot be reached via the first network using the first network interface, based on the acquired information regarding the third network, setting, in a routing table, route information for transmitting data addressed to the external apparatus connected to the first network via the second network and the control apparatus, wherein in a case where the determination based on the information regarding the third network is that the third network can be reached via the first network using the first network interface, based on the acquired information regarding the third network, the route information for transmitting data addressed to the external apparatus connected to the first network via the second network and the control apparatus, is not set in the routing table.

13. A non-transitory computer-readable storage medium storing a program for causing a computer to execute a method of controlling a job processing apparatus, the job processing apparatus having a first network interface wherein the job apparatus is able to communicate, via the first network interface, with an external apparatus connected to a first network, and a second network interface which is different from the first network interface, wherein the job apparatus is able to communicate, via the second network interface, with a control apparatus connected to a third network which is different from the first network and wherein the control apparatus is able to communicate via a network interface with the external apparatus connected to the first network via a second network which is different from the first network and the third network, and the method comprising:

acquiring, via the second network interface, information regarding the third network from the control apparatus;

performing determination based on the acquired information regarding the third network whether the third network cannot be reached via the first network using the first network interface; and in a case where the determination based on the acquired information regarding the third network is that the third network cannot be reached via the first network using the first network interface, based on the acquired information regarding the third network, setting, in a routing table, route information for transmitting data addressed to the external apparatus connected to the first network via the second network and the control apparatus, wherein in a case where the determination based on the information regarding the third network is that the third network can be reached via the first network using the first network interface, based on the acquired information regarding the third network, the route information for transmitting data addressed to the external apparatus connected to the first network via the second network and the control apparatus, is not set in the routing table.

* * * * *